Dec. 3, 1940.   S. B. WINN   2,223,436
TRAILER VEHICLE
Filed Feb. 18, 1939   2 Sheets-Sheet 1
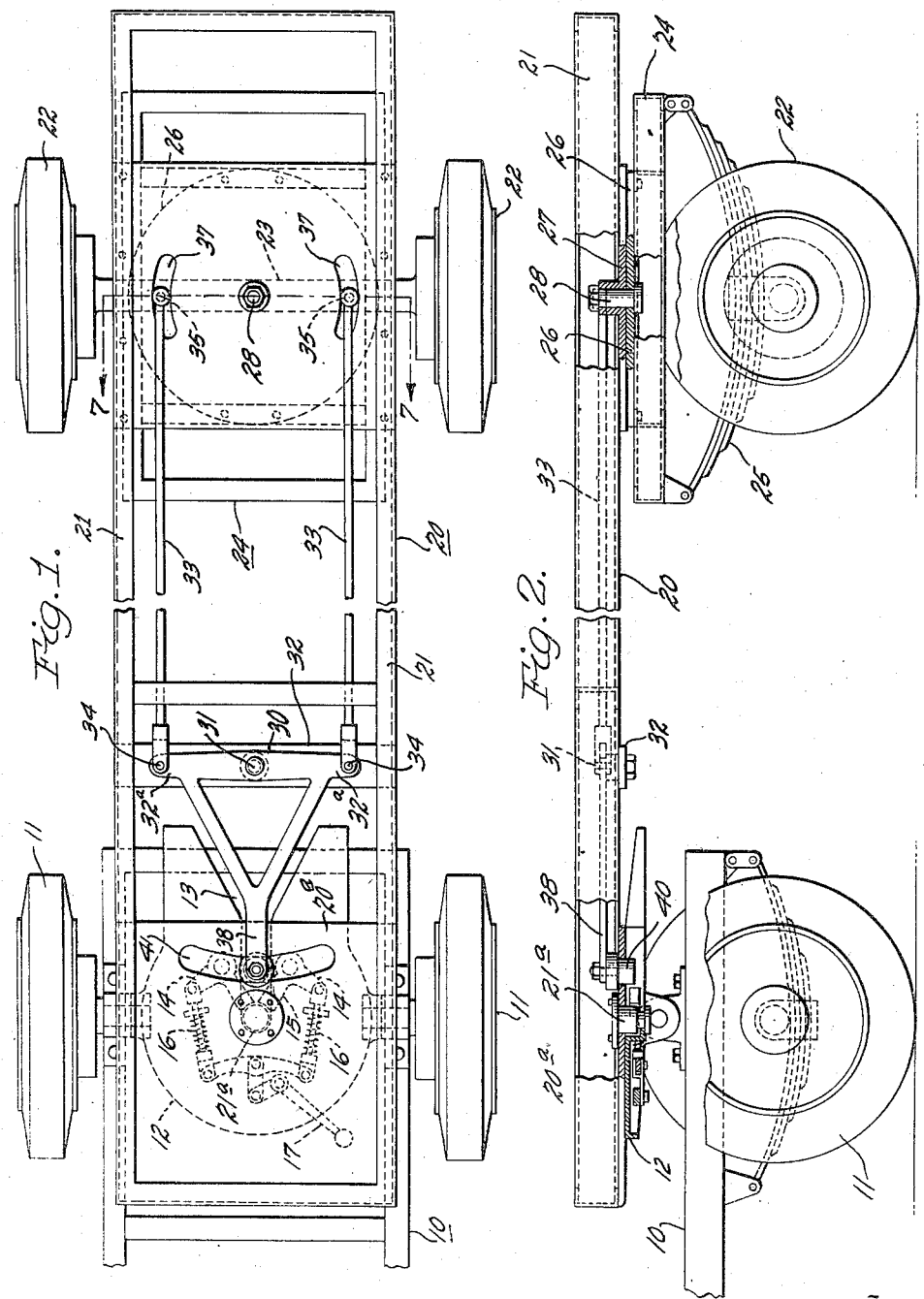
Inventor
Sidney B. Winn,
BY
Attorneys

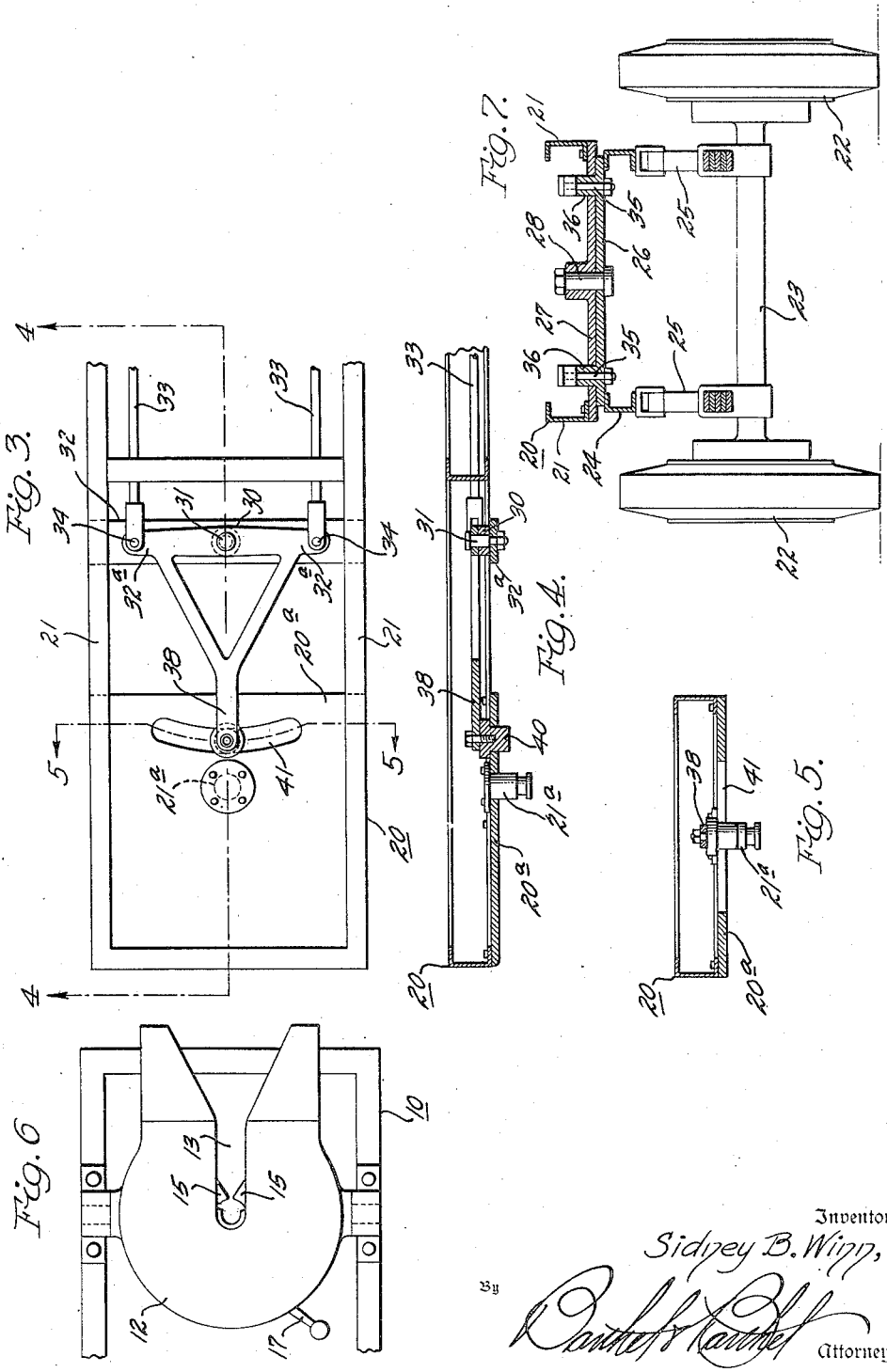

Patented Dec. 3, 1940

2,223,436

UNITED STATES PATENT OFFICE 2,223,436

TRAILER VEHICLE

Sidney B. Winn, Lapeer, Mich.

Application February 18, 1939, Serial No. 257,061

7 Claims. (Cl. 280—33.5)

This invention relates generally to tractor-trailer vehicles and more particularly to steering mechanism for the rear wheels of trailers.

It is an object of the present invention to provide a novel steering mechanism for the rear wheels of a trailer vehicle of a character such that the trailer rear wheels are steered in accordance with the steering of a tractor to which the trailer is coupled.

Another object of the invention is to provide automatic steering of the rear wheels of a trailer vehicle by the fifth wheel of a tractor coupled to the trailer.

A further object of the invention is to provide automatic steering of the rear wheels of a trailer vehicle in which the steering mechanism is automatically coupled to a tractor upon coupling the tractor to the trailer.

Other objects of the invention will become apparent from the following detailed description in connection with the accompanying two sheets of drawings in which—

Figure 1 is a top plan view of a trailer vehicle embodying my invention;

Fig. 2 is a side view of the trailer having parts broken away and in section to show certain details of construction;

Fig. 3 is a top plan view of a front portion of the trailer vehicle;

Fig. 4 is a view shown in section of the vehicle taken along the line and in the direction of the arrows 4—4 of Fig. 3;

Fig. 5 is a view shown in cross section taken along the line and in the direction of the arrows 5—5 of Fig. 3;

Fig. 6 is a top plan view of a rear end portion of a tractor for the trailer, and Fig. 7 is a view shown partly in elevation and partly in cross section taken along the line and in the direction of the arrows 7—7 of Fig. 1.

Referring to the drawings by characters of reference, there is shown a rear portion of a tractor having a frame 10 supported in part by rear wheels 11, and pivotally mounted on the frame side members, a fifth wheel 12 is provided having coupling jaws or a king pin receiving slot 13. Mounted on the underside of the fifth wheel 12, coupling mechanism is provided which may be of any suitable type for coupling to a trailer vehicle and, in the present instance, comprises a pair of oppositely disposed levers 14 positioned on opposite jaws and having arms 15 to swing out into the slot 13. Springs 16, act to pivot the levers 14 in opposite directions such that their arms 15 will swing inwardly in the path of the slot and a manually operable lever 17 is provided by means of which to move the levers in the opposite direction when uncoupling the tractor from a trailer.

Shown coupled to the tractor is a trailer having a frame 20 including longitudinal side frame members 21 rigidly secured together by suitable cross members. A plate 20a rigidly secured to the frame adjacent the front end thereof is provided to rest on the upper surface of the tractor fifth wheel 12 and secured to the plate and depending therefrom is a king pin 21a for positioning in the fifth wheel slot 13 and cooperate with the coupling levers 14 to couple the vehicle together pivotally.

Rear wheels 22 mounted on an axle 23, support a frame or under carriage 24 on elliptical leaf springs 25, the frame 24 being positioned beneath the main trailer frame 20 adjacent the rear end thereof. Mounted on and rigidly secured to the frame 24 is a circular supporting plate 26 and rigidly secured to the underside of the main frame 21, a plate member 27 is provided for seating on the upper surface of the plate 26, these plates having aligning central apertures to receive a pivot pin 28. Thus, the rear wheels of the trailer are arranged to swivel about the pivot 28 or be steered relative to the main trailer frame 20. The rear wheels are operatively connected to the tractor fifth wheel 12, when the vehicles are coupled, by mechanism including a lever 30 which is pivoted, as at 31, to a cross member 32 of the main trailer frame 20 at a point between the king pin 21a and the trailer rear wheels. The lever 30 is provided with oppositely directed arms 32a and a pair of connecting rods or links 33 have their forward ends pivotally connected, as at 34, to respective lever arms and have their rear ends pivotally connected as at 35 to upstanding diametrically disposed bosses 36 which are integral with the plate 26 of the rear wheel carriage assembly. These bosses 36 extend through and are movable in arcuate slots 37, provided in the plate 27 of the main trailer frame 20. Thus, it will be seen that pivoting of the lever 30 in one direction will steer the trailer rear wheels in a corresponding direction.

The lever 30 has a loose connection with the tractor fifth wheel 12 so that the trailer rear wheel steering mechanism is readily and automatically connected and/or disconnected from the trailer in coupling and uncoupling the vehicles. To this end, the lever 30 is provided with a forwardly extending operating arm 38 which, when the vehicles are coupled, loosely positions or projects into the fifth wheel slot 13 whereby when the tractor turns the lever arm 38 is engaged by the side edge of the slot 13 depending upon the direction of turn and this motion is transmitted by the rods 33 to the trailer rear wheels which are then turned or steered accordingly. Preferably, a bearing or abutment member 40 which may be a roller is mounted on the forward end of the lever arm 38 and depending therefrom rides or travels in an arcuate slot 41 in the plate 20a which steadies the movement and limits travel of the lever in opposite directions.

It will be understood that trailers of the type herein described are provided with a prop to support the front end thereof when the trailer is uncoupled from a tractor, such a prop being omitted from the present disclosure as it forms no part of the invention and is well known in the art to which this invention appertains.

From the foregoing description it will now be seen that I have provided for the steering of the rear wheels of a trailer by and in accordance with turning or the direction of travel of a tractor coupled to the trailer. It will further be appreciated that my trailer rear wheel, tractor actuated steering mechanism is operatively and automatically connected to a tractor upon coupling operation and is automatically disconnected upon uncoupling of the vehicles. This is, of course, advantageous because the steering mechanism does not need any manual attention upon coupling or uncoupling and assures that the rear trailer wheels are under control when the vehicles are coupled.

While I have shown and described my invention in detail it is to be understood that the same is to be limited only by the appended claims for many changes may be made without departing from the spirit and scope of the invention.

What I claim is:

1. In combination with a tractor having a fifth wheel provided with a slot and with coupling mechanism associated therewith, a trailer having a support, rear wheels for said support and arranged to be steered relative thereto, a king pin carried by said support to position in the fifth wheel slot and cooperate with the coupling mechanism to couple the vehicles together pivotally, steering mechanism for the rear wheels and carried solely by said support, said steering mechanism including a lever member pivoted to said support and having an arm loosely positioned in said slot and terminating intermediate the king pin and the trailer rear wheels.

2. In combination with a tractor having a fifth wheel provided with a slot and having coupling mechanism associated therewith, a trailer comprising a frame, rear wheels supporting the frame and arranged to be steered relative thereto, a king pin carried by said frame to position in said slot and cooperate with said coupling mechanism to couple the vehicles together pivotally, a lever pivotally mounted on said frame, means operatively connecting said lever and said rear wheels, said lever having an arm provided with an abutment loosely positioned in the slot of the fifth wheel when the vehicles are coupled together, said abutment being positioned between the king pin and the trailer rear wheels.

3. In combination with a tractor having a fifth wheel provided with a slot and with coupling mechanism associated therewith, a trailer including a frame, rear wheels supporting the frame and arranged to be steered relative thereto, a plate member secured to said frame and having an arcuate slot, a king pin secured to said plate member in advance of said arcuate slot to position in the fifth wheel slot and cooperate with the coupling mechanism to couple the vehicles together, a lever pivoted to the frame in advance of the rear wheels, means operatively connecting said lever and the rear wheels, said lever having an arm positioned in the fifth wheel slot to be engaged by the opposed side edges of the slot and having a guide member longitudinally movable in said arcuate slot.

4. In combination with a tractor having a fifth wheel provided with a rearwardly opening V-shaped slot and having coupling mechanism associated with the slot, a trailer having a support, rear wheels for said support and arranged to be steered relative thereto, coupling means carried by said support and cooperable with the coupling mechanism of the fifth wheel to couple the vehicles together pivotally, steering mechanism for the rear wheels and including a lever member pivoted to said support rearwardly of said support coupling means, said lever member having an arm for loosely positioning in said V-shaped slot and operable by the side walls defining the slot.

5. In combination with a tractor having a fifth wheel provided with coupling means, a trailer having a frame supported by rear wheels arranged to be steered, coupling means carried by said frame and cooperable with the coupling means of said fifth wheel to couple the vehicles together, steering mechanism for the trailer rear wheels and carried by said frame, an operating member for said steering mechanism and operated by means on the tractor, said operating member being disposed rearwardly of and in alignment with said frame.

6. In combination with a tractor having a fifth wheel provided with coupling means, a trailer having a frame supported by rear wheels arranged to be steered, coupling means carried by said frame and cooperable with the coupling means of said fifth wheel to couple the vehicles together, steering mechanism for the trailer rear wheels and carried by said frame, an operating member carried by said frame for operating the steering mechanism, said operating member being separate from said coupling means and automatically connected to operating means on the tractor upon backing of the tractor into the trailer.

7. In combination with a tractor having a fifth wheel provided with coupling means and provided with a king pin receiving slot, a trailer having a frame supported by rear wheels arranged to be steered, a king pin carried by said frame and cooperable with the coupling means of said fifth wheel to couple the vehicles together, steering mechanism for the trailer rear wheels and carried by said frame, an operating member carried by said frame for operating the steering mechanism and positioned in the fifth wheel slot for operation by the fifth wheel, said operating member being held in said slot rearwardly of and in alignment with said king pin.

SIDNEY B. WINN.